United States Patent [19]

Margotte et al.

[11] Patent Number: 5,308,912
[45] Date of Patent: May 3, 1994

[54] POLYURETHANE COATING COMPOSITIONS CONTAINING POLYETHER POLYOLS AS ADDITIVES

[75] Inventors: Dieter Margotte, Krefeld; Werner Kubitza, Leverkusen, both of Fed. Rep. of Germany

[73] Assignee: Bayer Aktiengesellschaft, Leverkusen, Fed. Rep. of Germany

[21] Appl. No.: 971,449

[22] Filed: Nov. 4, 1992

[30] Foreign Application Priority Data

Nov. 13, 1991 [DE] Fed. Rep. of Germany ....... 4137229

[51] Int. Cl.⁵ .................................. C08L 75/06
[52] U.S. Cl. ...................... 524/507; 524/539; 524/591; 524/839; 524/840
[58] Field of Search ............ 524/507, 539, 591, 839, 524/840

[56] References Cited

U.S. PATENT DOCUMENTS

| | | | |
|---|---|---|---|
| 3,607,822 | 9/1971 | Nishino | 260/37 |
| 4,977,207 | 12/1990 | Hofer | 524/507 |
| 5,075,370 | 12/1991 | Kubitza et al. | 524/591 |
| 5,194,487 | 3/1993 | Jacobs | 524/591 |

*Primary Examiner*—Joseph L. Schofer
*Assistant Examiner*—Jeffrey T. Smith
*Attorney, Agent, or Firm*—Joseph C. Gil; Thomas W. Roy

[57] ABSTRACT

The present invention relates to an aqueous coating composition containing a) an aqueous solution or dispersion of a polyol component containing at least one water-dilutable polyacrylate resin having hydroxyl groups and a molecular weight ($M_n$) above 500, b) a polyisocyanate component which has a viscosity of 50 to 10,000 mPa.s at 23° C. and is emulsified in component a), and c) 0.5 to 6% by weight, based on the weight of component a), of a water-soluble polyether polyol having a molecular weight of 300 to 1000, wherein the coating composition has an NCO/OH equivalent ratio of 0.5:1 to 5:1, based on the isocyanate groups of component b) and the alcoholic hydroxyl groups of components a) and c).

8 Claims, No Drawings

POLYURETHANE COATING COMPOSITIONS CONTAINING POLYETHER POLYOLS AS ADDITIVES

BACKGROUND OF THE INVENTION

1. Filed of the Invention

This invention relates to the use of certain water-soluble polyether polyols as additives for aqueous coating compositions wherein the binder is based on a combination of water-dilutable polyacrylate resins and organic polyisocyanates.

2. Description of the Prior Art

Ecological considerations play an important role in the coatings technology. One particularly urgent problem is the reduction in the quantities of organic solvents used for lacquers and coating materials.

For a long time it was to possible to dispense with organic solvents for chemically cross-linking polyurethane lacquers which play an important role in coatings technology due to their excellent properties. It appeared for a long time that it would not be possible to use water instead of organic solvents in two-component polyurethane lacquers based on polyisocyanates containing free isocyanate groups since it was known that isocyanate groups reacted not only with alcoholic hydroxyl groups but also with water. Moreover, the concentration of active hydrogen atoms in such systems due to the presence of water is much higher than the concentration of hydroxyl groups from the organic, isocyanate reactive component. It was therefore inevitably assumed that the main reaction in the ternary system of polyisocyanate/organic polyhydroxyl compounds/water would be a reaction between isocyanate and water with the formation of urea and carbon dioxide. This would result in the organic polyhydroxyl compounds remaining unreacted and would cause foaming of the reaction mixture due to the formation of carbon dioxide.

Aqueous two-component binders based on water-dilutable polyacrylate resins and organic polyisocyantes were first described in EP-A-O 358 979. The coating compositions described in this publication result in films which have excellent hardness after curing but insufficient gloss for many purposes. Further, the elasticity and abrasion resistance are insufficient for many applications. These properties are required, for example, for coating wood and furniture and for coating flexible substrates such as cork or synthetic resins.

It has now surprisingly been found that the addition of small quantities of water-soluble polyether polyols of the type described below to such aqueous coating compositions results in a marked improvement in the gloss, elasticity and abrasion resistance of coatings obtained from the coating compositions.

SUMMARY OF THE INVENTION

The present invention relates to an aqueous coating composition containing a) an aqueous solution or dispersion of a polyol component containing at least one water-dilutable polyacrylate resin having hydroxyl groups and a molecular weight ($M_n$) above 500, b) a polyisocyanate component which has a viscosity of 50 to 10,000 mPa.s at 23° C. and is emulsified in component a), and c) 0.5 to 6% by weight, based on the weight of component a), of a water-soluble polyether polyol having a molecular weight of 300 to 1000, wherein the coating composition has an NCO/OH equivalent ratio of 0.5:1 to 5:1, based on the isocyanate groups of component b) and the alcoholic hydroxyl groups of components a) and c).

DETAILED DESCRIPTION OF THE INVENTION

Component a) of the coating compositions of the present invention is a water-dilutable polyol component containing at leas tone water-dlutable polymer resin. These polymer resins are polymers of olefinically unsaturated monomers containing hydroxyl groups; sulphonate and/or carboxylate groups, preferably carboxylate groups; and optionally sulphonic acid and/or carboxyl groups, preferably carboxyl groups. These polymers preferably have a molecular weight ($M_n$, determined by gel permeation chromatography) of 500 to 50,000, preferably 1000 to 10,000; a hydroxyl number of 16.5 to 264, preferably 33 to 165 mg of KoH/g of solid resin; an acid number (based on the sulphonic acid and/or carboxyl groups which remain unneutralized) of 0 to 150, preferably 0 to 100 mg of KOH/g of solid resin; and a sulphonate and/or carboxylate group content of 5 to 417, preferably 24 to 278 milliequivalent per 100 g of solids. The anionic groups are preferably carboxylate groups.

The polymer resins a) are generally used in the form of 10 to 50% by weight, preferably 20 to 40% by weight solutions and/or dispersions for preparing the coating compositions according to the invention. These solutions an dispersions generally have a viscosity of 10 to 100,000, preferably 100 to 10,000 mPa.s/23° C. and a pH of 5 to 10, preferably 6 to 9.

The aqueous systems containing the polymers are true dispersions, colloidally disperse dispersions or molecular dispersions, depending on the molecular weight of the polymers and their ionic group content or free acid group content, in particular carboxyl group content. They are generally so-called "partial dispersions," i.e., aqueous systems which are partly molecular dispersions and partly colloidal dispersions.

The hydroxyl group-containing polymers which are present in the form of aqueous solutions or dispersions and described in EP-A-O 358 978 (U.S. Pat. No. 5,075,370, herein incorporated by reference) are especially suitable for use as component a) according to the invention. For information on the preparation of the hydroxyl group containing polymers, see EP-A-O 358 979, page 3, line 25 to page 4, line 40 or U.S. Pat. No. 5,075,370.

When polymerization has been completed, the copolymers are converted into an aqueous solution or dispersion. For this purpose, the organic polymer solution is introduced into an aqueous medium, which has in most cases been preheated, and the organic solvent is at the same time distilled off, generally under a vacuum. In order to obtain good solubility or dispersibility in water, it is generally necessary to add a neutralizing agent such as inorganic bases, ammonia or amines to the aqueous phase. Suitable inorganic bases include sodium hydroxide or potassium hydroxide, while suitable amines include trimethylamine, triethylamine or dimethylethanolamine.

The neutralizing agents may be used in less or more than the stoichiometric quantity to obtain the desired acid numbers and sulphonate group and/or carboxylate group contents. When the acid groups are completely neutralized, the acid number is zero and the sulphonate group and/or carboxylate group content corresponds to the original sulphonic acid or carboxyl group content. When the acid groups are partially neutralized, the sulphonate and/or carboxlyate group contents correspond to the quantity of neutralizing agent used. Care must be taken, especially when a stoichiometric excess of neutralizing agent is used, to ensure that the electrolytic character of the polymers does not cause a marked increase in viscosity to take place.

The aqueous solutions or dispersions obtained have the above-mentioned concentrations and viscosities and generally contain less than 5% by weight, preferably less than 2% by weight, of residual solvents. The solvents, even those which have a higher boiling point than water, can be removed virtually completely by azeotropic distillation.

Resins which have been prepared by the known methods of emulsion polymerization and otherwise conform to the criteria mentioned above may, of course, be used instead of the previously described hydroxyl group-containing polyacrylate resins prepared by solution polymerization.

The polyol component present in the form of a solution or dispersion in water is primarily based on the previously described water-dilutable polyacrylate resins containing hydroxyl groups. This means that the polyol component contains at least 51% by weight, preferably at least 80% by weight and more preferably 100% by weight of these polyacryalte resins. However, other water-dilutable resins may also be present as part of polyol component a) in addition to the polyacryalte resins. Examples of these other resins include the known anionically modified, i.e., carboxylate group-containing, water-dilutable polyester resins which may optionally contain urethane groups. The constituents of polyol component a) differ, of course, from the polyether polyols which are an essential feature of the present invention.

Polyisocynate component b) may be any organic polyisocynate which has aliphatically, cycloaliphtically, araliphatically and/or aromatically bound free isocyante groups and is liquid at room temperature. Polyisocyante component b) preferably has a viscosity of 50 to 10,000, more preferably 50 to 1000, mPa.s at 23° C.

Polyisocyanate component b) most preferably only contains polyisocyanates or polyisocyanate mixtures having aliphatically and/or cycloaliphatically bound polyisocyanate groups, an (average) isocyanate functionality (average) of 2.2 to 5.0 and a viscosity at 23° C. of 50 to 500 mPa.s. Suitable polyisocyanates b) include those described in EP-A-O 358 979 at page 5, lines 2 to 55 (U.S. Pat. No. 5,075,370, herein incorporated by reference).

If necessary, the polyisocyanates may be used as mixtures with small quantities of inert solvents to lower the viscosity to a value within these ranges. However, the maximum quantity in which the inert solvents are used is limited so that the coating compositions according to the invention ultimately obtained contain at most 20% by weight of solvent, based on the quantity of water. Any solvent present in the dispersions or solutions of component a) is included in the calculation. Examples of solvents suitable as additives for the polyisocyanates include aromatic hydrocarbons, e.g., "solvent naphtha," or the solvents previously described.

The additives which are essential components for this invention are water-soluble polyether polyols c) having a molecular weight ($M_n$, calculated from the hydroxyl functionality and hydroxyl group content) of 300 to 1000, preferably 350 to 800. The polyether polyols preferably have from 2 to 4 hydroxyl groups, more preferably 2 to 3 hydroxyl groups, per molecule. The polyether polyols are alkoxyltion products of suitable starter molecules which are known from polyurethane chemistry, in particular those obtained by alkoxylation with ethylene oxide and/or propylene oxide, which may either be used as mixtures and/or successively. Examples of suitable starter molecules include water, ethylene glycol, propylene glycol, the isomeric butanediols, hexanediosl, glycerol, trimethylolpropane, pentaerythritol and mixtures of these compounds.

To prepare the coating compositions according to the present invention, polyisocyanate b) is emulsified in the aqueous dispersion or solution of polyol component a) which functions as emulsifier for the polyisocyanate. This applies in particular to a preferred embodiment wherein polyisocyanates b) have not been hydrophilically modified. It is possible, but not preferred, to use hydrophilically modified polyisocyanates as polisocyanate component b). The polyisocyanates may be rendered water-dispersible by incorporating ionic or non-ionic hydrophilic centers. Emulsification may be carried out by simple stirring at room temperature.

The polyether polyols c) which are essential for the present invention may be added to the aqueous solution or dispersion of polyol component a) at any stage before, during and/or after the addition of polyisocyanate component b), but the polyether polyol is preferably added to the aqueous solution or dispersion of component a) by simply mixing it with the aqueous solution or dispersion before the addition of polyisocyanate component b).

The polyether polyols c) are used in quantities of 0.5 to 6% by weight, preferably 1 to 4.5% by weight, based on the weight of the solids content of polyol component a). Polyisocyanate component b) is used in an amount sufficient to provide an NCO/OH equivalent ratio, based on the isocyanate groups of component b) and the alcoholic hydroxyl groups of component a) and the polyether polyols c), of 0.5:1 to 5:1, preferably 0.8:1 to 2:1.

In addition to the essential polyether polyol additives, other known auxiliary agents and additives conventionally used in coating technology may be added to polymer component a) before the addition of polyisocyanate component). Examples of these additives include defoamants, levelling agents, pigments, dispersing agents for the distribution of pigments, external emulsifiers for improving the compatibility of the binder components for water, thickeners, and the like.

The coating compositions according to the present invention are suitable for various applications for which solvent-containing coating compositions with superior properties have previously been used. Examples include the industrial coating of wood and furniture, for which abrasion resistance and high gloss are particularly important; the coating and sealing of the surfaces of various mineral building materials, e.g., concrete, plaster or fiber-reinforced cement surfaces; the coating of metallic substrates such as aluminum or steel; the coating of synthetic resins; and the coating of wood products such as paper, hardboard and the like.

The coatings may be cured either at room temperature or at elevated temperatures of up to 250° C., especially when accelerated curing is necessary.

The percentages given in the following examples are percentages by weight.

EXAMPLES

Starting materials

Polyacrylate dispersions I. II and III

The polyacrylate dispersions were 30% aqueous emulsions of ammonia-neutralized copolymers prepared from the monomers set forth in the following Table. The dispersions were prepared according to the method of preparation set forth in EP-A-O 358 979 (U.S. Pat. No. 5,075,370, herein incorporated by reference).

TABLE 1

| Polyacrylate dispersion | I | II | III |
|---|---|---|---|
| Methyl methacrylate (g) | 266 | 116 | 381 |
| Styrene (g) | 266 | 116 | — |
| Acrylic acid n-butylester (g) | 300 | 600 | 450 |
| Acrylic acid (g) | 150 | 150 | 150 |
| Methacrylic acid-2-hydroxyethyl ester (g) | 459 | 459 | 459 |
| Hydroxyl group content based on the solid resin (%) | 4 | 4 | 4 |
| Carboxylate group content (milliequivalents per 100 g of solid resin) | 139 | 139 | 139 |

Polyisocyanate I

A mixture of (i) 70 parts by weight of a polyisocyanate containing uretdione groups and containing dimerized hexamethylene diisocyanate and minor quantities of its higher homologues and (ii) 30% by weight of an isocyanurate group-containing polyisocyanate containing N,N',N"-tris-(6-isocyanatohexyl) -isocyanurate and minor quantities of its higher homologues.

Viscosity (23° C.): 200 mPa.s
NCO content: 22.5%

Polyisocyanate II

N, N', N"-tris-(6-isocyanatohexyl)-biuret mixed with minor quantities of its higher homologues Viscosity (23° C.): 3000 mPa.s
NCO content: 22.5

Polyetherpolyol I

A polyether polyol having a molecular weight ($M_n$) of 530 and prepared by the propoxylation of trimethylolpropane.

Polyetherpolyol II

A polyether polyol having a molecular weight ($M_n$) of 700 and prepared by the ethoxylation of trimethlolpropane.

Polyetherpolyol III

A polyether polyol having a molecular weight ($M_n$) of 530 and prepared by the propoxylaton of glycerol.

EXAMPLE 1

(Comparison Example)

330 parts by weight of polyacrylate dispersion I were mixed with 0.5 parts by weight of a 25% by weight solution of a commercial emulsifier (Emulsifier WV, Bayer AG, Leverkusen), 2 parts by weight of a 20% aqueous solution of a commercial non-ionic polyurethane thickener (Acrysol AM 8, Rohm and Haas, Frankfurt), 0.6 parts by weight of a commercial defoamant (Byk 023, Byk Wesel) and 10 parts by weight of water. This mixture remained storage stable indefinitely. 20 parts by weight of polyisocyanate I were then added to 100 parts by weight of this emulsion and intimately mixed therewith (corresponding to an NCO-/OH equivalent ratio, based on the alcoholic hydroxyl groups, of 1.5:1). A coating applied wet to a test sheet to form a layer 210 μm in thickness had a drying time of about 3 hours. The properties of the coating are summarized in Table 2.

EXAMPLE 2

330 parts by weight of polyacrylate dispersion I were mixed with 2 parts by weight of polyether I. The auxiliary agents were then added to this mixture as described in Example 1. 20 parts by weight of polyisocyanate I were then stirred in. A coating was prepared as described in Example 1. The properties are summarized in Table 2.

EXAMPLE 3

330 parts by weight of polyacrylalte dispersion II were mixed with 4 parts by weight of polyether polyol I. The auxiliary agents were than added to this mixture as described in Example 1. 20 parts by weight of polyisocyanate I were then stirred in. A coating was prepared as described in Example 1. The properties are summarized in Table 2.

EXAMPLE 4

330 parts by weight of polyacryalte dispersion II were mixed with 3 parts by weight of polyether polyol II. The auxiliary agents were then added to this mixture as described in Example 1. 20 parts by weight of polyisocyanate I were then stirred in (NCO/OH equivalent ratio =1.2:1). A coating was prepared as described in Example 1. The properties are summarized in Table 2.

EXAMPLE 5

330 parts by weight of polyacrylate dispersion III were mixed with 2 parts by weight of polyether polyol III. The auxiliary agents were then added to this mixture as described in Example 1. 20 parts by weight of polyisocyanate I were then stirred in. A coating was prepared as described in Example 1. The properties are summarized in Table 2.

TABLE 2

| Example | 1 | 2 | 3 | 4 | 5 |
|---|---|---|---|---|---|
| Degree of gloss, determined by reflection at an angle of 60° according to DIN 53 230 | 45° | 84° | 88° | 84° | 82° |
| Abrasion (Table-Abrader) CS10-steep after 1000 revolutions under a load of 1 kg | 50 mg | 24 mg | 30 mg | 21 mg | 35 mg |
| Pendulum resistance (Konig) | 5 sec | 100 sec | 90 sec | 105 sec | 95 sec |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous coating composition comprising
   a) an aqueous solution or dispersion of a polyol component containing at least one water-dilutable polyacrylate resin having hydroxyl groups and a molecular weight ($M_n$) 500 to 50,000,
b) a polyisocyanate component which has a viscosity of 50 to 10,000 mPa.s at 23° C. and is emulsified in component a), and
c) 0.5 to 6% by weight, based on the weight of component a), of a water-soluble polyether polyol having a molecular weight of 300 to 1000, wherein the coating composition has an NCO/OH equivalent ratio of 0.5:1 to 5:1, based on the isocyanate groups of component b) and the alcoholic hydroxyl groups of components a) and c).

2. The aqueous coating composition of claim 1 wherein component c) is present in an amount of 1 to 4.5% by weight, based on the weight of component a), and said water-soluble polyether polyol has a molecular weight of 350 to 800.

3. The aqueous coating composition of claim 1 wherein the isocyanate groups of the polyisocyanate component b) are aliphatically and/or cycloaliphatically bound.

4. The aqueous coating composition of claim 2 wherein the isocyanate groups of the polyisocyanate component b) are aliphatically and/or cycloaliphatically bound.

5. An aqueous coating composition comprising
a) an aqueous solution or dispersion of a polyol component containing at least one water-dilutable polyacryalte resin having a molecular weight ($M_n$) of 500 to 50,000, a hydroxyl number of 16.5 to 264 mg of KOH/g of solid resin, an acid number of 0 to 150 mg of KOH/g of solid resin and a sulphonate and/or carboxylate group content of 5 to 417 milliequivalents per 100 g of solids,
b) a polyisocyanate component which has a viscosity of 50 to 10,000 mPa.s at 23° C. and is emulsified in component a), and
c) 0.5 to 6% by weight, based on the weight of component a), of a water-soluble polyether polyol having a molecular weight of 300 to 1000, wherein the coating composition has an NCO/OH equivalent ratio of 0.5:1 to 5:1, based on the isocyanate groups of component b) and the alcoholic hydroxyl groups of components a) and c).

6. The aqueous coating composition of claim 5 wherein component c) is present in an amount of 1 to 4.5% by weight, based on the weight of component a), and said water-soluble polyether polyol has a molecular weight of 350 to 800.

7. The aqueous coating composition of claim 5 wherein the isocyanate groups of the polyisocyanate component b) are aliphatically and/or cycloaliphatically bound.

8. The aqueous coating composition of claim 6 wherein the isocyanate groups of the polyisocyanate component b) are aliphatically and/or cycloaliphatically bound.

* * * * *